US011882151B2

(12) United States Patent
Spector et al.

(10) Patent No.: US 11,882,151 B2
(45) Date of Patent: Jan. 23, 2024

(54) SYSTEMS AND METHODS FOR PREVENTING THE FRAUDULENT SENDING OF DATA FROM A COMPUTER APPLICATION TO A MALICIOUS THIRD PARTY

(71) Applicant: JPMORGAN CHASE BANK, N.A., New York, NY (US)

(72) Inventors: Howard Spector, Woolwich, NJ (US); Glenn Gray, New York, NY (US); Jin Wen, Fremont, CA (US); Donald B. Roberts, Delaware, OH (US); Matthew Cerini, Woodmere, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 317 days.

(21) Appl. No.: 17/331,488

(22) Filed: May 26, 2021

(65) Prior Publication Data

US 2021/0377302 A1 Dec. 2, 2021

Related U.S. Application Data

(60) Provisional application No. 63/033,107, filed on Jun. 1, 2020.

(51) Int. Cl.
*H04L 29/06* (2006.01)
*H04L 9/40* (2022.01)
*G06Q 20/40* (2012.01)

(52) U.S. Cl.
CPC ..... *H04L 63/1483* (2013.01); *G06Q 20/4016* (2013.01); *H04L 63/0236* (2013.01);
(Continued)

(58) Field of Classification Search
CPC ............. H04L 63/0236; H04L 63/0823; H04L 63/1425; H04L 63/1483; H04L 63/20; G06Q 20/4016
See application file for complete search history.

(56) References Cited

U.S. PATENT DOCUMENTS 7,526,730 B1 * 4/2009 Cahill ..................... H04L 67/02
715/862
8,990,933 B1 * 3/2015 Magdalin ................ G06F 21/85
709/229

(Continued)

OTHER PUBLICATIONS

Adam Bates et al., Securing SSL Certificate Verification through Dynamic Linking, Nov. 3, 2014, ACM, pp. 394-405. (Year: 2014).*

(Continued)

*Primary Examiner* — Jeffrey C Pwu
*Assistant Examiner* — Fahimeh Mohammadi
(74) *Attorney, Agent, or Firm* — GREENBERG TRAURIG LLP

(57) ABSTRACT

Systems and methods for preventing the fraudulent sending of data from a computer application to a malicious third party are disclosed. In one embodiment, a method for preventing a computer application from sending data to an unauthorized website may include: (1) receiving, at a computer application executed by an electronic device and from a first website, an identification of a second website for receiving data from the computer application; (2) providing, by the computer application and to a certificate authority, the identification of the second website, wherein the certificate authority validates that the second website is on a list of allowed websites for the first website; (3) receiving, by the computer application and from the certificate authority, validation; and (4) communicating, by the computer application, the data to the second website.

10 Claims, 3 Drawing Sheets

(52) U.S. Cl.
CPC ...... *H04L 63/0823* (2013.01); *H04L 63/1425* (2013.01); *H04L 63/20* (2013.01)

(56) References Cited

U.S. PATENT DOCUMENTS

| | | | | |
|---|---|---|---|---|
| 10,581,908 | B2* | 3/2020 | Hunt | H04L 9/3247 |
| 2009/0031409 | A1* | 1/2009 | Murray | H04N 21/8166 |
| | | | | 726/10 |
| 2009/0178116 | A1* | 7/2009 | Nagoya | H04L 63/1441 |
| | | | | 705/34 |
| 2011/0145435 | A1* | 6/2011 | Bhatawdekar | G06F 16/9566 |
| | | | | 726/26 |
| 2012/0005038 | A1* | 1/2012 | Soman | G06Q 20/12 |
| | | | | 705/26.41 |
| 2014/0283068 | A1* | 9/2014 | Call | H04L 63/0428 |
| | | | | 726/23 |
| 2014/0298464 | A1* | 10/2014 | Xavier | H04L 63/1483 |
| | | | | 726/23 |
| 2015/0381654 | A1* | 12/2015 | Wang | G06F 21/6245 |
| | | | | 726/23 |
| 2017/0118029 | A1* | 4/2017 | Salmi | H04L 67/02 |
| 2018/0124110 | A1* | 5/2018 | Hunt | G06F 16/951 |
| 2019/0334930 | A1* | 10/2019 | Abbe | H04W 12/03 |
| 2019/0334948 | A1* | 10/2019 | Jiang | H04L 65/40 |
| 2021/0203690 | A1* | 7/2021 | Nunes | G06N 3/088 |

OTHER PUBLICATIONS

Pravin Soni et al., A Phishing Analysis of Web Based Systems, Feb. 12, 2011, ACM, pp. 527-530. (Year: 2011).*

Josh Aas et al., Let's Encrypt: An Automated Certificate Authority to Encrypt the Entire Web, Nov. 6, 2019, ACM, pp. 2473-2487. (Year: 2019).*

Qinghua Zhang, Study on Fraud Risk Prevention of Online Banks, May 5, 2009, IEEE, pp. 181-184. (Year: 2009).*

International Search Report, dated Sep. 13, 2021, from corresponding International Application No. PCT/US2021034481.

Written Opinion of the International Searching Authority, dated Sep. 13, 2021, from corresponding International Application No. PCT/US2021034481.

* cited by examiner

SYSTEMS AND METHODS FOR PREVENTING THE FRAUDULENT SENDING OF DATA FROM A COMPUTER APPLICATION TO A MALICIOUS THIRD PARTY

RELATED APPLICATIONS

This application claims priority to, and the benefit of, U.S. Provisional Patent Application Ser. No. 63/033,107 filed Jun. 1, 2020, the disclosure of which is hereby incorporated, by reference, in its entirety.

BACKGROUND OF THE INVENTION

1. Field of the Invention

Embodiments relate generally to systems and methods for preventing the fraudulent sending of data from a computer application, such as a web browser, to a malicious third party.

2. Description of the Related Art

Online data and credit card skimming attacks have become a serious concern for ecommerce websites and web applications around the world, especially as the market continues to shift towards online purchasing. Card skimming attacks have increased in scale and scope over the last decade, proving that these types of attacks continue to be a persistent problem for online retailers.

The client-side computer application, such as a web browser, is the front-door for consumer interactions, as it is where the customer data is displayed, entered, and then received by vendors. "Skimming" is a method used by attackers to capture sensitive information from online payment forms, such as name, passwords, and credit card numbers.

For example, a merchant website may become "infected" with malware, and may capture the user's payment and other data. The malware may then send this information to a malicious third party. Because the data appears to have come from the trusted website, cross-site scripting prevention will not stop this type of attack.

SUMMARY OF THE INVENTION

Systems and methods for preventing the fraudulent sending of data from a computer application to a malicious third party are disclosed. In one embodiment, a method for preventing a computer application from sending data to an unauthorized website may include: (1) receiving, at a computer application executed by an electronic device and from a first website, an identification of a second website for receiving data from the computer application; (2) providing, by the computer application and to a certificate authority, the identification of the second website, wherein the certificate authority validates that the second website is on a list of allowed websites for the first website; (3) receiving, by the computer application and from the certificate authority, validation; and (4) communicating, by the computer application, the data to the second website.

In one embodiment, the data may include payment information.

In one embodiment, the list of allowed websites may be received from an administrator of the first website.

In one embodiment, the computer application may include a browser.

In one embodiment, the identification of the second website may include a uniform resource locator for the second website.

According to another embodiment, a method for preventing a computer application from sending data to an unauthorized website may include: (1) receiving, at a computer application and from a first website, an identification of a second website for receiving data from the computer application; (2) providing, by the computer application and to a certificate authority, the identification of the second website, wherein the certificate authority determines that the second website is not on a list of allowed websites for the first website; (3) receiving, by the computer application and from the certificate authority, a notification that the second website is not on the list of allowed websites; and (4) blocking, by the computer application, communication of data to the second website.

In one embodiment, the data may include payment information.

In one embodiment, the list of allowed websites may be received from an administrator of the first website.

In one embodiment, the computer application may include a browser.

In one embodiment, the identification of the second website may include a uniform resource locator for the second website.

In one embodiment, the method may further include alerting, by the computer application, an administrator for the first website that the second website is not on the list of allowed websites.

In one embodiment, the method may further include reporting, by the computer application, the first website to a third party, wherein the third party maintains a list of compromised websites.

According to another embodiment, a method for preventing a computer application from sending data to an unauthorized website may include: (1) receiving, at a computer application executed by an electronic device and from a first website, an identification of a second website for receiving data from the computer application; (2) receiving, by the computer application and from a first website, a list of allowed websites, wherein the list of allowed websites may be signed with a private key for the first website; (3) determining, by the computer application, that the second website is not on the list of allowed websites; and (4) blocking, by the computer application, communication of data to the second website.

In one embodiment, the data may include payment information.

In one embodiment, the computer application may include a browser.

In one embodiment, the identification of the second website may include a uniform resource locator for the second website.

In one embodiment, the method may further include alerting, by the computer application, an administrator for the first website that the second website is not on the list of allowed websites.

In one embodiment, the method may further include reporting, by the computer application, the first website to a third party, wherein the third party maintains a list of compromised websites.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Embodiments relate generally to systems and methods for preventing the fraudulent sending of data from a computer application to a malicious third party.

Embodiments introduce a layer of security that the computer application may consult before making an outbound call. This layer verifies that the call that is to be made is safe to execute.

Figure 1:
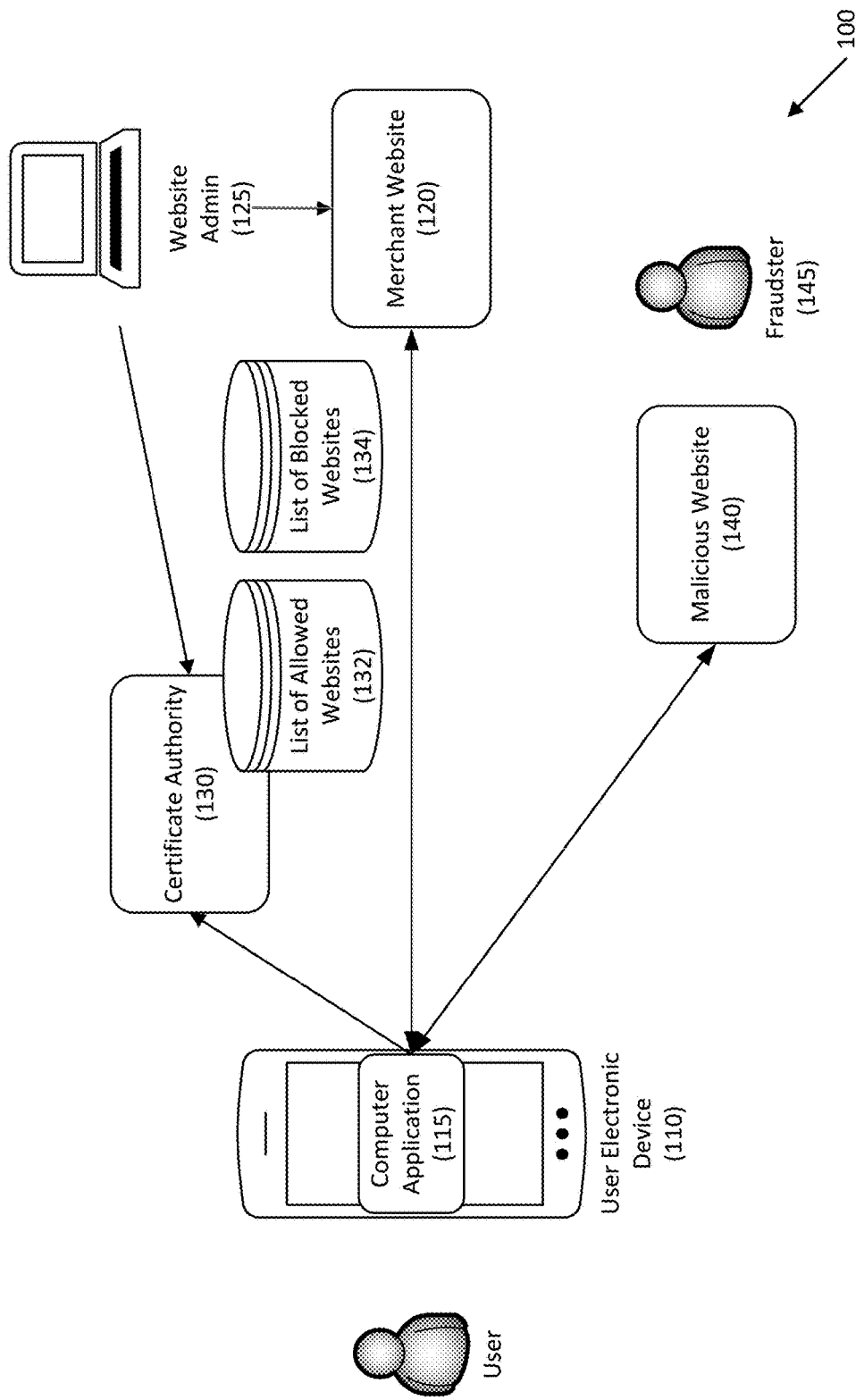
FIG. 1 is a depicts a system for preventing the fraudulent sending of data from a computer application to a malicious third party according to an embodiment.

Referring to FIG. 1, a system for preventing the fraudulent sending of data from a computer application to a malicious third party is disclosed according to one embodiment. System 100 may include user electronic device 110 that may execute computer program 115. In one embodiment, user electronic device 110 may be any suitable electronic device, including smart phones, computers (e.g., desktops, notebook, laptops, workstations, etc.), Internet of Things ("IoT") appliances, etc. In one embodiment, computer program 115 may be a web browser, an application or program that accesses one or more website, etc.

The data may include payment data, customer data, or any other suitable data that may be submitted to a website.

Computer program 115 may navigate to merchant website 120, which may be provided at a uniform resource locator (URL) address. Merchant website 120 may be administered by website administrator 125.

Certificate authority 130 may maintain a SSL certificate for websites, including merchant website 120. Merchant website 120 may use certificate authority 130 to obtain a SSL certificate, and computer program 115 may validate that SSL certificate and show a "lock" in the an interface, such as a browser interface.

In one embodiment, certificate authority 130 may maintain a list of allowed websites 132 that the computer program 115 can send data to for a given domain or domain and page combination in a datastore. In one embodiment the list of allowed websites may be maintained at certificate authority 130, or it may be maintained separately.

In another embodiment, certificate authority 130 may maintain a list of blocked websites 134, such as known compromised websites, that the computer program 115 is blocked from sending data to. In another embodiment, certificate authority 130 may maintain both a list of allowed websites and a list of blocked websites.

In one embodiment, website administrator 125 may identify the websites to include in the list of allowed websites 132.

For example, if a website is compromised, the malicious code (e.g., JavaScript) that is sent to computer program 115 would attempt to send customer data to fraudster 145 at malicious website 140. Because certificate authority 130 does not include malicious website 140's domain in the list of allowed websites 132 that computer program 115 can send information to, computer program 115 will block the call to malicious website 140, and the information will not be sent.

In another embodiment, the list of allowed websites may be contained within the webpage itself as data that has been signed by the website's private key. The data is static data on the website and is not generated. Thus, because fraudster 145 does not have access to the website's private key, fraudster 145 cannot inject information for malicious website 140 into the webpage.

In one embodiment, the merchant or business may use their private key to generate a signature for the requested URL (base URL+any parameters) this signature will be placed in the response header. The browser or device readying the response may read the signature from the header and then use the sites registered public key to validate it. This may occur, for example, as the page is drawing, and could warn/stop the customer from filling in data on a fraudulent site.

Figure 2:
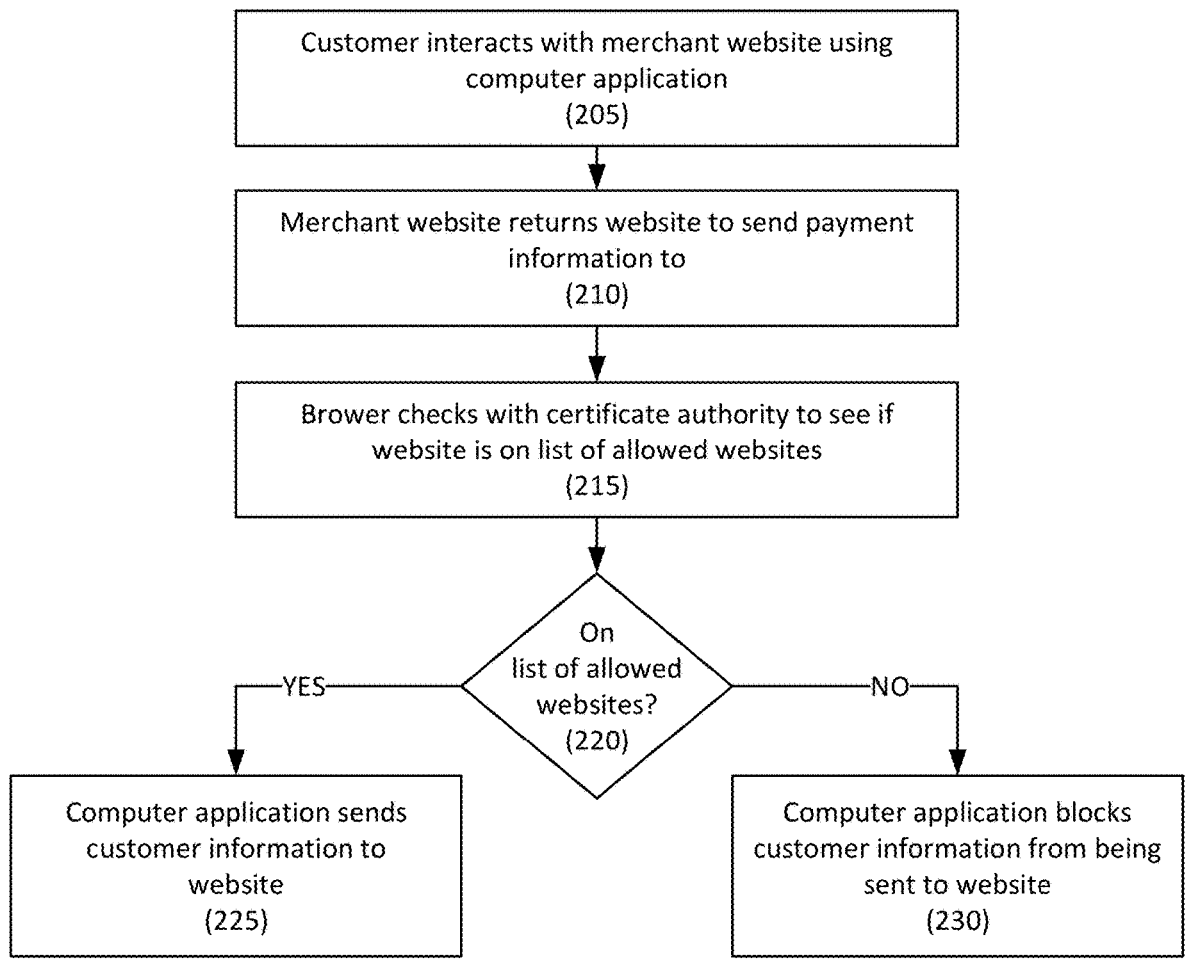
FIG. 2 depicts a method for preventing the fraudulent sending of data from a computer application to a malicious third party according to an embodiment.

Referring to FIG. 2, a method for preventing the fraudulent sending of data from a computer application to a malicious third party is disclosed according to one embodiment.

In step 205, a customer may interact with a merchant website using a computer application, such as a browser.

In step 210, the merchant website may return a website for the computer application to send customer information (e.g., payment information) to. If the merchant website has been compromised, the malicious code on the merchant website may identify a malicious website to send the customer information to.

In step 215, the computer application may check with the certificate authority to verify that the returned website is on the list of allowed websites identified by the merchant's website administrator.

Alternatively, the certificate authority may check to see if the returned website is on the list of blocked websites.

In step 220, if the returned website is on the list of allowed websites, or is not on the list of blocked websites, indicating that the merchant website has not been compromised, in step 225, the computer application may send the customer information to the returned website.

If the returned website is not on the list of allowed websites, or is on the list of blocked websites, indicating that the merchant website has been compromised and that the returned website may be a malicious website, in step 230, the computer application may block the customer information from being sent to the malicious website. In one embodiment, additional actions, such as alerting the merchant, may be taken as is necessary and/or desired.

In one embodiment, a third party may maintain a list of compromised websites, and the computer application may report the merchant website to the third party as is necessary and/or desired. The disclosure of U.S. patent application Ser. Nos. 63/085,010 and 17/103,255 are hereby incorporated, by reference, in their entireties.

Figure 3:
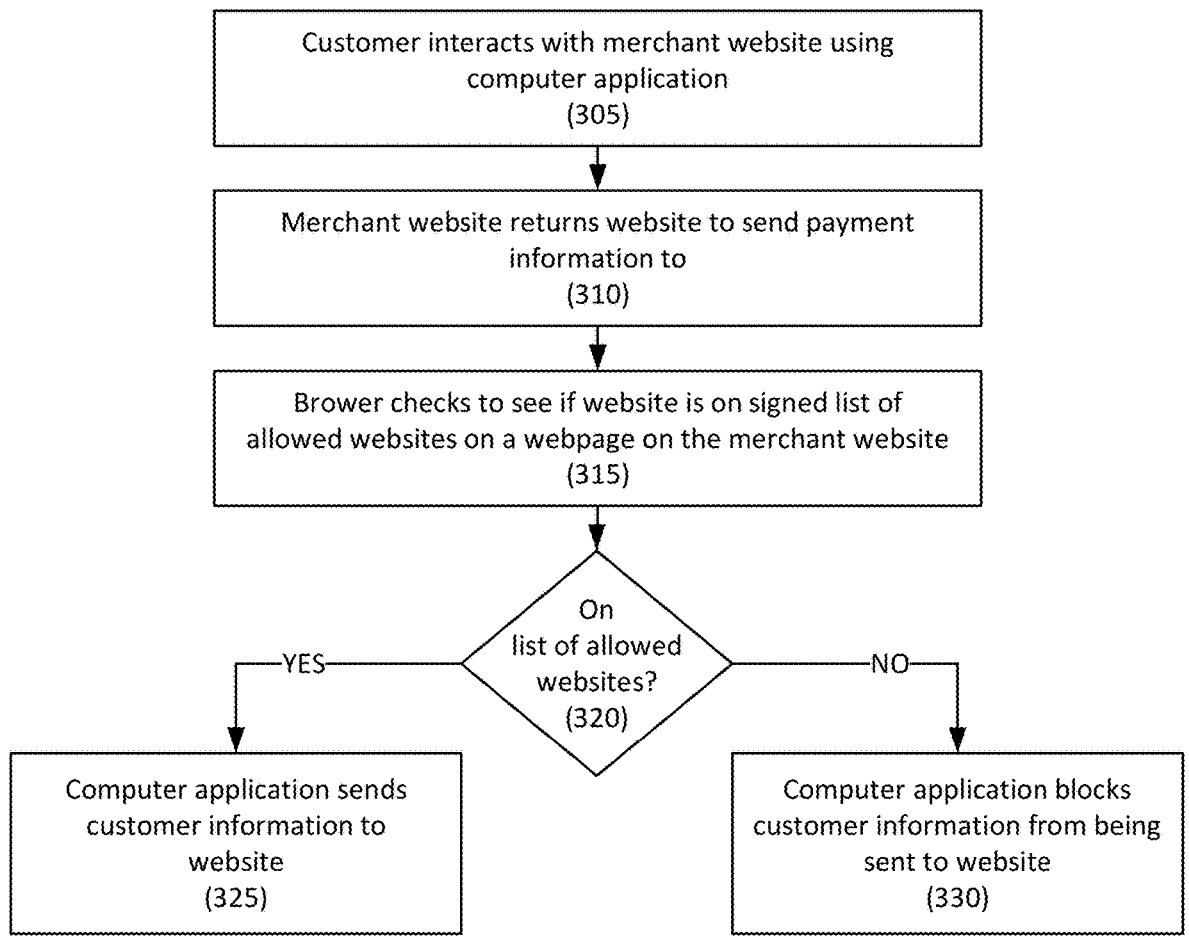
FIG. 3 depicts a method for preventing the fraudulent sending of data from a computer application to a malicious third party according to another embodiment.

Referring to FIG. 3, a method for preventing the fraudulent sending of data from a computer application to a malicious third party is disclosed according to another embodiment.

In step 305, a customer may interact with a merchant website using a computer application. This is similar to step 205, above.

In step 310, the merchant website may return a website for the computer application to send customer information (e.g., payment information) to. This is similar to step 210, above.

In step 315, the computer application may check the webpage's signed list of approved websites, or signed list of blocked websites. In one embodiment, the merchant's website administrator may provide the list of approved websites and/or blocked websites and may sign the list with the merchant website's private key. The signed list may be included in one or more webpage on the merchant's website.

In one embodiment, the computer application may use the merchant website's pubic key to decrypt the signed list.

In step 320, if the returned website is on the list of allowed websites, or is not on the list of blocked websites, indicating that the merchant website has not been compromised, in step 325, the computer application may send the customer information to the returned website.

If the returned website is not on the list of allowed websites, or is on the list of blocked websites, indicating that the merchant website has been compromised and that the returned website may be a malicious website, in step 330, the computer application may block the customer information from being sent to the malicious website. In one embodiment, additional actions, such as alerting the merchant, reporting the merchant website to a third party, etc. may be taken as is necessary and/or desired.

In addition, the computer application may capture statistics around portions of the domain (e.g., the number of lines of script) and the resulting value may be included in a header. The statistics may be reviewed, and if the statistics differ from an expected value (e.g., additional lines of script were added), the computer application may block the customer information from being transmitted to the malicious website.

In one embodiment, the website that checks with the certificate authority may be automatically put into a maintenance or similar mode to prevent other unknown or zero-day issues from being exploited.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for preventing a computer application from sending data to an unauthorized website, comprising:

sending, by a web browser computer application executed by an electronic device, a request for a website, wherein the website is located at a first uniform resource locator (URL), and wherein a secured sockets layer (SSL) certificate is maintained for the website by a certificate authority;

receiving, at the web browser computer application executed by the electronic device, a response from the website, wherein the response from the website includes a webpage of a domain, and wherein the webpage of the domain is configured to receive user-input data from the web browser computer application;

providing, by the web browser computer application and to the certificate authority, a second URL, wherein the second URL identifies the webpage and the domain, and wherein the certificate authority validates that the domain and the webpage are included on a list of domain and webpage combinations authorized to receive the user-input data for the website, wherein the list of domain and webpage combinations is received from an administrator of the website;

receiving, by the computer application and from the certificate authority, validation of the domain and the webpage; and communicating, by the web browser computer application, the user-input data to the webpage.

2. The method of claim 1, wherein the user-input data comprises payment information.

3. A method for preventing a computer application from sending data to an unauthorized website, comprising:

sending, by a web browser computer application executed by an electronic device, a request for a website, wherein the website is located at a first uniform resource locator (URL), and wherein a secured sockets layer (SSL) certificate is maintained for the website by a certificate authority;

receiving, at the web browser computer application executed by the electronic device, a response from the website, wherein the response from the website includes a webpage of a domain, and wherein the webpage of the domain is configured to receive user-input data from the web browser computer application;

providing, by the web browser computer application and to the certificate authority, a second URL, wherein the second URL identifies the webpage and the domain, and wherein the certificate authority determines that the domain and the webpage are not on a list of domain and webpage combinations authorized to receive the user-input data for the website, wherein the list of domain and webpage combinations is received from an administrator of the website;

receiving, by the web browser computer application and from the certificate authority, a notification that the domain and the webpage are not on the list of domain and webpage combinations authorized to receive the user-input data for the website; and blocking, by the web browser computer application, communication of the user-input data to the webpage of the domain.

4. The method of claim 3, wherein the user-input data comprises payment information.

5. The method of claim 3, further comprising:

alerting, by the web browser computer application, an administrator for the website that the domain and the webpage are not on the list of domain and webpage combinations authorized to receive the user-input data for the website.

6. The method of claim 3, further comprising:

reporting, by the web browser computer application, the website to a third party, wherein the third party maintains a list of compromised websites.

7. A method for preventing a computer application from sending data to an unauthorized website, comprising:

sending, by a web browser computer application executed by an electronic device, a request for a website, wherein the website is located at a first uniform resource locator (URL), and wherein a secured sockets layer (SSL) certificate is maintained for the website by a certificate authority;

receiving, at the web browser computer application executed by the electronic device, a response from the website, wherein:

the response from the website includes a signed response;

the signed response is signed with a private key for the website;

the signed response includes a list of webpages authorized to receive user-input data for the website, wherein the list of webpages is received from an administrator of the website;

the response includes a second URL; and the second URL identifies a webpage configured to receive the user-input data from the web browser computer application;

decrypting, by the web browser computer application, the response using a public key of the website;

determining, by the web browser computer application, that the second URL not on the list of webpages authorized to receive the user-input data for the website; and blocking, by the web browser computer application, communication of the user-input data to the second URL.

8. The method of claim 7, wherein the user-input data comprises payment information.

9. The method of claim 7, further comprising:

alerting, by the web browser computer application, the administrator of the website that the second URL is not on the list of webpages authorized to receive the user-input data for the website.

10. The method of claim 7, further comprising:

reporting, by the web browser computer application, the website to a third party, wherein the third party maintains a list of compromised websites.

* * * * *